United States Patent
Soleski et al.

(10) Patent No.: US 9,368,782 B2
(45) Date of Patent: Jun. 14, 2016

(54) MANUFACTURING SERVICE DISCONNECT THAT IS PART OF BUSBAR

(71) Applicant: Johnson Controls Technology LLC, Wilmington, DE (US)

(72) Inventors: Edward J. Soleski, Mequon, WI (US); Stephen D. Cash, Cary, IL (US); Gary P. Houchin-Miller, Milwaukee, WI (US); Mikhail S. Balk, Brown Deer, WI (US); Bryan L. Thieme, Colgate, WI (US); Richard M. DeKeuster, Racine, WI (US)

(73) Assignee: Johnson Controls Technology LLC, Wilmington, DE (US)

( * ) Notice: Subject to any disclaimer, the term of this patent is extended or adjusted under 35 U.S.C. 154(b) by 344 days.

(21) Appl. No.: 13/910,895

(22) Filed: Jun. 5, 2013

(65) Prior Publication Data

US 2013/0330594 A1 Dec. 12, 2013

Related U.S. Application Data

(60) Provisional application No. 61/656,378, filed on Jun. 6, 2012.

(51) Int. Cl.
*H01M 2/34* (2006.01)
*F16P 3/00* (2006.01)
(Continued)

(52) U.S. Cl.
CPC ............... *H01M 2/34* (2013.01); *B60L 11/14* (2013.01); *B60L 11/1864* (2013.01); *B60L 11/1874* (2013.01); *B60L 11/1877* (2013.01); *B60L 11/1879* (2013.01); *F16P 3/00* (2013.01); *H01R 11/282* (2013.01); *H01R 13/633* (2013.01); *B60L 2200/12* (2013.01); *B60L 2200/18* (2013.01); *B60L 2200/32* (2013.01); *B60L 2200/36* (2013.01); *B60L 2200/44* (2013.01); *H01M 2/20* (2013.01); *H01M 2/202* (2013.01); *H01M 2/204* (2013.01); *H01M 2/206* (2013.01); *H01M 2/208* (2013.01); *Y02T 10/70* (2013.01); *Y02T 10/7005* (2013.01); *Y02T 10/7061* (2013.01); *Y02T 10/7077* (2013.01); *Y10T 29/49108* (2015.01)

(58) Field of Classification Search
None
See application file for complete search history.

(56) References Cited

U.S. PATENT DOCUMENTS

| 4,156,552 | A | 5/1979 | Briggs et al. | |
|---|---|---|---|---|
| 2003/0165355 | A1* | 9/2003 | Lin et al. | 403/408.1 |
| 2006/0246781 | A1* | 11/2006 | Yoon et al. | 439/627 |

(Continued)

FOREIGN PATENT DOCUMENTS

EP 1750313 A1 2/2007

OTHER PUBLICATIONS

International Search Report and Written Opinion for PCT Application No. PCT/US2013/044533 dated Aug. 7, 2013, 13 pgs.

*Primary Examiner* — Ula C Ruddock
*Assistant Examiner* — Matthew Van Oudenaren
(74) *Attorney, Agent, or Firm* — Fletcher Yoder PC

(57) ABSTRACT

A battery system includes at least a first battery module and a second battery module, and a service disconnect unit electrically coupling the first battery module to the second battery module. The service disconnect unit comprises a bus bar that includes a first portion electrically connected to the first battery module, and a second portion electrically connected to the second battery module. The service disconnect unit also comprises a removable conductive member configured to electrically connect the first portion of the bus bar to the second portion of the bus bar.

20 Claims, 6 Drawing Sheets

(51) Int. Cl.
*H01R 11/28* (2006.01)
*H01R 13/633* (2006.01)
*B60L 11/14* (2006.01)
*B60L 11/18* (2006.01)
*H01M 2/20* (2006.01)

(56) References Cited

U.S. PATENT DOCUMENTS

2006/0270286 A1* 11/2006 Zhao et al. .................... 439/840
2007/0026739 A1* 2/2007 Kim et al. ..................... 439/627

* cited by examiner

MANUFACTURING SERVICE DISCONNECT THAT IS PART OF BUSBAR

CROSS REFERENCE TO RELATED APPLICATIONS

This application claims priority from and the benefit of U.S. Provisional application Ser. No. 61/656,378, entitled "MANUFACTURING SERVICE DISCONNECT THAT IS PART OF BUSBAR," filed Jun. 6, 2012, which is hereby incorporated by reference.

BACKGROUND

The present disclosure relates generally to battery systems, such as those used for vehicles deriving at least a portion of their power from an electrical power source. More specifically, the present disclosure relates to systems and methods for a service disconnect unit for such battery systems.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Vehicles, such as cars, trucks, and vans, are widely used to facilitate the movement of people and goods in modern society. Vehicles may utilize a number of different energy sources (e.g., a hydrocarbon fuel, a battery pack, a capacitance system, a compressed air system) to produce motive power. In particular, the term "xEV" may be used to describe any vehicle that derives at least a portion of its motive power from an electric power source (e.g., a battery system). For example, electric vehicles (EVs), which may also be referred to as all-electric vehicles, typically include a battery system and use electric power for all of their motive power. As such, EVs may be principally dependent on a plug-in power source to charge a battery system, while other power generation/conservation systems (e.g., regenerative braking systems) may help extend the life of the battery and the range of the EV during operation.

Two specific sub-classes of xEV are the hybrid electric vehicle (HEV) and the plug-in hybrid electric vehicle (PHEV). Both the HEV and the PHEVs generally include an internal combustion engine in addition to a battery system. For the PHEV, as the name suggests, the battery system is capable of being charged from a plug-in power source. A series hybrid vehicle (e.g., a series PHEV or HEV) uses the internal combustion engine to turn a generator that, in turn, supplies current to an electric motor to move the vehicle. In contrast, a parallel hybrid (e.g., a parallel PHEV or HEV) can simultaneously provide motive power from an internal combustion engine and a battery powered electric drive system. That is, certain xEVs may use electrical energy stored in the battery system to boost (i.e., provide additional power to) the powertrain of the vehicle. Furthermore, xEVs (e.g., PHEVs and HEVs) may take advantage of opportunistic energy capture (e.g., via regenerative braking systems or similar energy conservation systems) in addition to using at least a portion of the power from the engine to charge the battery system.

In general, xEVs may provide a number of advantages as compared to traditional, gas-powered vehicles that solely rely on internal combustion engines for motive power. For example, xEVs may produce fewer undesirable emission products and may exhibit greater fuel efficiency as compared to vehicles using only internal combustion engines to propel the vehicle. Furthermore, for some xEVs, such as all-electric EVs that lack an internal combustion engine, the use of gasoline may be eliminated entirely.

In the event that an xEV requires service or repair, it may be desirable to disconnect the battery system. Current service disconnect units may be difficult to access. For example, accessing the terminals of the battery module to disconnect the battery typically requires tools and technical expertise that only a skilled technician would possess. Due to the limited number of skilled technicians and the possibility that the necessary tools may not be available when the battery module needs to be disconnected, it would be desirable to have service disconnect unit that provides an easier way to disable the battery module.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to service disconnect units for battery systems having multiple battery modules. In accordance with disclosed embodiments, the service disconnect unit may include a bus bar having a first portion and a second portion, and a removable conductive member for electrically connecting the first and second portions of the bus bar. The removable conductive member may be coupled to a cover for the battery system, such that when the cover is removed from the system, the removable conductive member automatically disables the battery system.

Various refinements of the features noted above may exist in relation to the presently disclosed embodiments. Additional features may also be incorporated in these various embodiments as well. These refinements and additional features may exist individually or in any combination. For instance, various features discussed below in relation to one or more embodiments may be incorporated into other disclosed embodiments, either alone or in any combination. Again, the brief summary presented above is intended only to familiarize the reader with certain aspects and contexts of embodiments of the present disclosure without limitation to the claimed subject matter.

DRAWINGS

Various aspects of this disclosure may be better understood upon reading the following detailed description and upon reference to the drawings in which.

DETAILED DESCRIPTION

Figure 1:
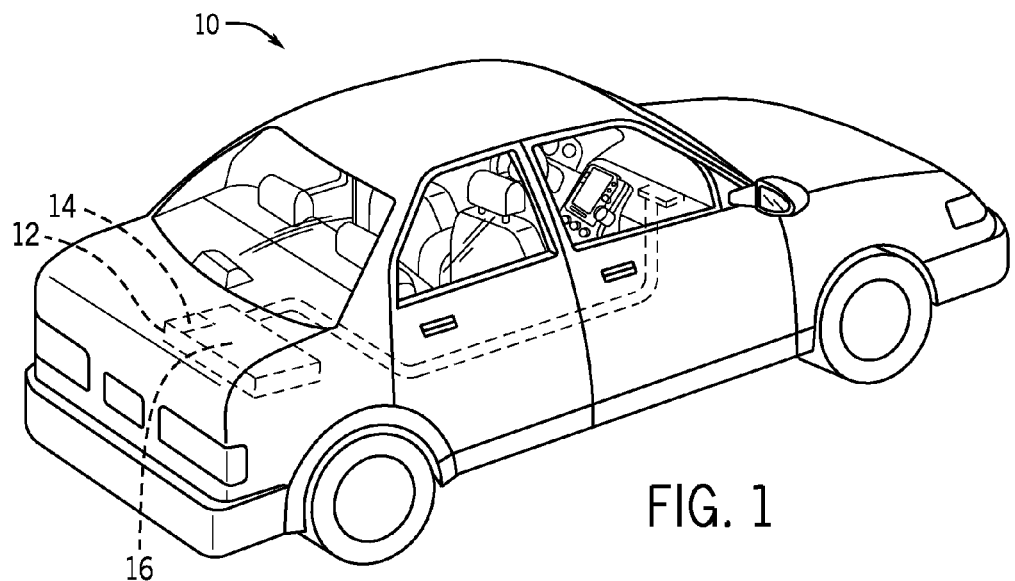
FIG. 1 is perspective view of an embodiment of a vehicle having a battery system contributing all or a portion of the motive power for the vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

For the purposes of the present disclosure, it should be noted that the presently disclosed embodiments of battery systems are particularly directed toward applications for xEV electric vehicles, although it should be understood that such battery systems may also be used in other energy storage applications, such as planes, wind turbines, solar panels, HVAC systems, uninterruptible power supplies, etc. As will be appreciated by those skilled in the art, hybrid electric vehicles (HEVs) combine an internal combustion engine propulsion and high voltage battery power to create traction. A plug-in electric vehicle (PEV) is any vehicle that can be charged from an external source of electricity, such as wall sockets, and the energy stored in the rechargeable battery system drives or contributes to drive the wheels. PEVs are a subcategory of electric vehicles that include all-electric or battery electric vehicles (BEVs), plug-in hybrid vehicles (PHEVs), and electric vehicle conversions of hybrid electric vehicles and conventional internal combustion engine vehicles. An electric vehicle (EV) is an all-electric vehicle that uses for its propulsion one or more motors powered by electric energy. The term "xEV" is defined herein to include all of the foregoing or any variations or combinations thereof that include electric power as a motive force.

Accordingly, present embodiments are directed towards systems and methods for disconnecting a battery system, such as those used in an xEV. Systems and methods include a service disconnect unit disposed between two cells in a battery module. The service disconnect unit includes a bus bar having a first portion and a second portion, and the two portions are electrically insulated from each other. The service disconnect unit may also include a removable conductive member configured to electrically couple the two portions of the bus bar. By integrating a service disconnect unit as part of the bus bar of a battery system, a number of advantages may result. For example, the battery system may be simpler and smaller since a separate service disconnect unit is not used. Also, the battery system may be easier to manufacture since the service disconnect unit is installed along with all of the other bus bars. In addition, the removable conductive member may be coupled to a cover of the battery system such that removal of the cover automatically removes the conductive member and disables the battery system.

Figure 2:
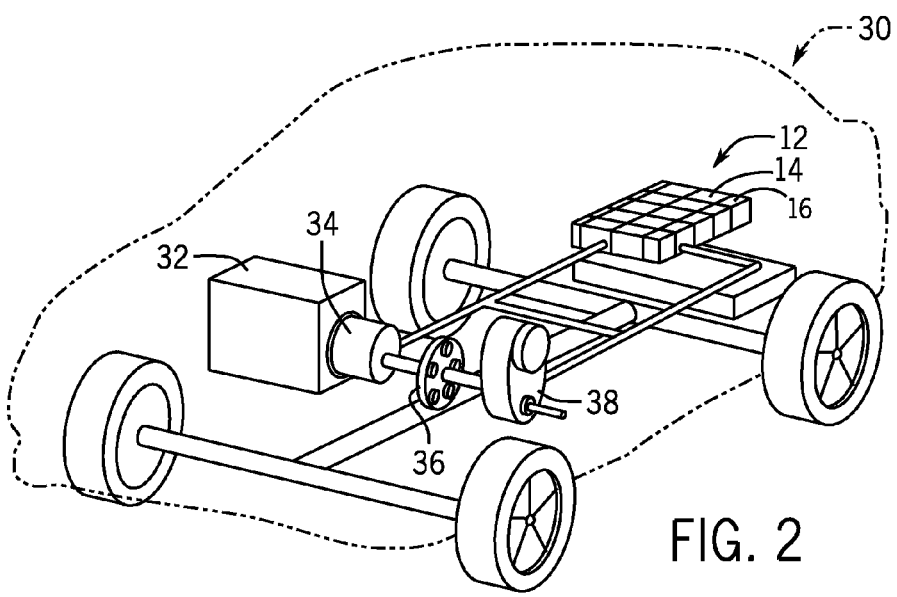
FIG. 2 illustrates a cutaway schematic view of an embodiment of the vehicle of FIG. 1 provided in the form of a hybrid electric vehicle.

With the foregoing in mind, FIG. 1 is a perspective view of an xEV 10 in accordance with an embodiment of a present disclosure. The illustrated xEV 10 may be any type of vehicle having a battery system for providing at least a portion of the motive power to propel the vehicle. For example, the xEV 10 may be an all-electric vehicle (EV), a hybrid electric vehicle (HEV), a plug-in hybrid electric vehicle (PHEV), or other type of vehicle using electric power to provide at least a portion of the propulsion for the vehicle. Although the xEV 10 is illustrated as a car in FIG. 1, in other embodiments, other types of vehicles may be used with the present technique. For example, in other embodiments, the xEV 10 may be a truck, bus, industrial vehicle, motorcycle, recreational vehicle, boat, or any other type of vehicle that may move, at least partially, using electric power. Accordingly, the xEV 10 includes a battery system 12 capable of supplying electrical power to the xEV 10 that may be used to move the xEV 10, in addition to powering other features of the xEV 10 (e.g., lights, automatic windows, automatic locks, entertainment systems, and similar components and accessories of the xEV 10). It should be appreciated that the term "battery system" as used herein may generally refer to a battery pack that includes a number of battery modules 14 containing electrochemical cells, and a service disconnect unit 16. It should also be appreciated that, although the battery system 12 illustrated in FIG. 1 is positioned in the trunk or rear of the xEV 10, in other embodiments, the battery system 12 may be positioned elsewhere in the xEV 10. For example, battery system 12 may be positioned based on the available space within the xEV 10, the desired weight balance of the xEV 10, the location of other components used with the battery system 12 (e.g., battery management systems, vents or cooling devices, or similar systems), and similar engineering considerations.

xEVs, like the one illustrated in FIG. 1, may be divided into more specific sub-classes based on the internal design of the vehicle. FIG. 2 is a cutaway schematic view of a specific xEV, a hybrid electric vehicle (HEV) 30, including a battery systems with a service disconnect unit in accordance with an example embodiment of the present disclosure. Like the xEV 10 illustrated in FIG. 1, the HEV 30 includes a battery system 12 toward the rear of the HEV 30. In certain embodiments, a plurality of battery modules 14 connected in parallel may each include a separate service disconnect unit 16. Additionally, the HEV 30 includes an internal combustion engine 32, which may combust a hydrocarbon fuel to produce power that may be used to propel the HEV 30. Also, the HEV 30 is equipped with an electric motor 44 that is coupled to the battery system 12 and is also used to propel the HEV 30. The illustrated HEV 30 is also equipped with a power split device 36, which allows a portion of the power (e.g., rotational energy) to be directed to a generator 38 suitable for charging the battery system 12. It should be noted that other types of xEVs (e.g., EVs, HEVs, PHEVs, etc.) and other configurations (e.g., the type of vehicle, the type of vehicle technology, and the battery chemistry, among other configurations) may be used in various embodiments of the present approach.

Figure 3:
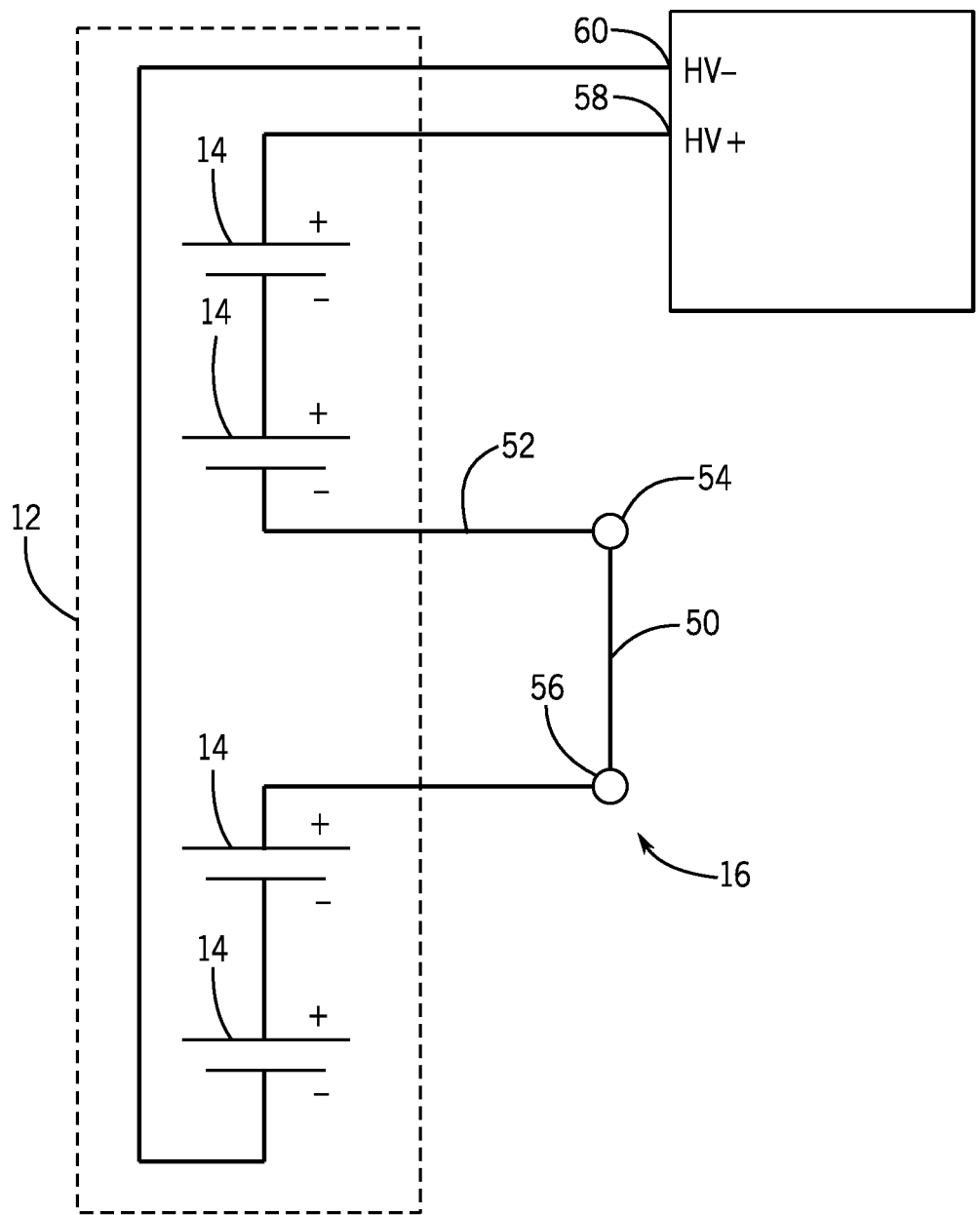
FIG. 3 is a circuit diagram of a service disconnect unit in a battery system, in accordance with an embodiment of the present disclosure.

As mentioned above, in the event that the xEV 10 or the HEV 30 requires repair or servicing, it would be desirable to easily disconnect the battery system 12 since it is no longer needed to provide power. To provide a convenient disconnect for the battery system 12, the service disconnect unit 16 may be included in the battery system 12, as illustrated in FIG. 3. In the embodiment of FIG. 3, the service disconnect unit 16 may include a removable conductive member 50 which, when inserted, electrically couples a first portion 54 of a bus bar 52 and a second portion 56 of the bus bar 52 of the battery module.

The battery system 12 may include a plurality of battery modules 14 having cells, which are electrically connected in series to generate a voltage across a positive high voltage terminal 58 and a negative high voltage terminal 60. The positive high voltage terminal 58 and the negative high voltage terminal 60 may electrically couple and provide power to the power systems of the xEV 10. During normal operation of the battery system 12, the service disconnect unit 16 may electrically couple the first portion 54 and the second portion 56 of the bus bar 52 to allow current to flow through the battery system 12. During servicing, a technician may disengage the service disconnect unit 16 by disengaging the removable conductive member 50 to electrically isolate each half of the battery system 12, thus allowing the technician to work on the xEV 10. In certain embodiments, the removable conductive member 50 may be configured to be removed with a cover of the battery system 12 housing, such that when the cover of the battery system 12 housing is removed, the conductive member 50 is removed so that the service disconnect unit 16 automatically disables the battery system 12.

Figure 4:
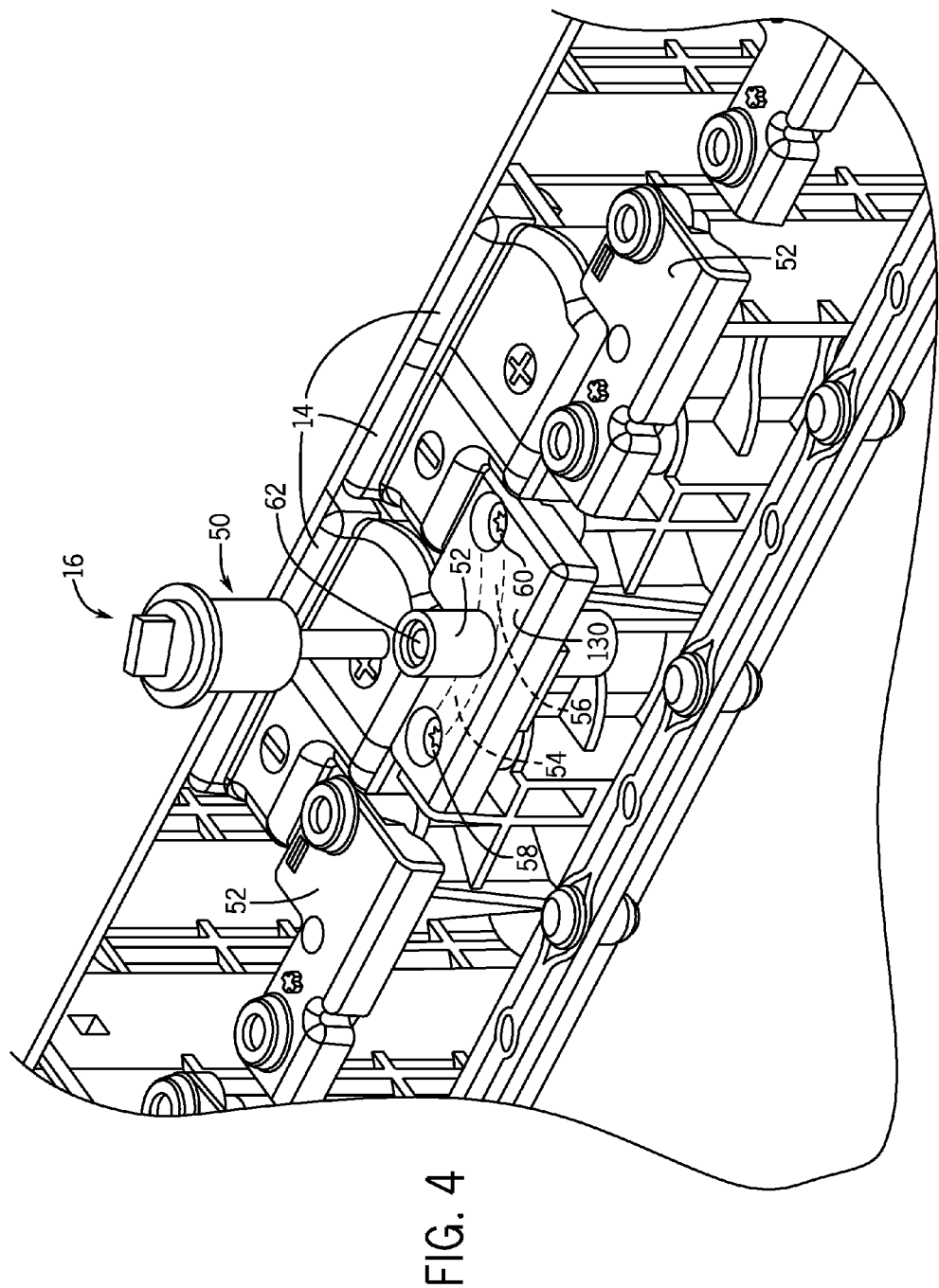
FIG. 4 is a partially exploded perspective view of a battery system having the service disconnect unit of FIG. 3.

During the initial manufacture of the battery system 12, depending on the number of battery modules 14 in the system 12 and the voltage across the battery modules 14, one or more service disconnect units 16 may be included among the bus bars 52 connecting the battery modules 14. The removable conductive member(s) 50 of the one or more service disconnect units 16 may not be inserted until the end of the manufacturing process, such that the circuit between the battery modules 14 is incomplete for all or a portion of the manufacturing process. In this way, the voltage across the battery system 12 may be reduced during the manufacturing process to provide the benefit of not working with a high voltage circuit during manufacturing due to one or more of the service disconnect units 16 being open. In other words, prior to insertion of the conductive member 50 for each service disconnect unit, no portion of the battery system 12 will be above a certain voltage level, such as 60V for example, during the manufacturing process As shown in FIG. 4, the battery system 12 may include one or more battery modules 14, which may be connected to each other in series. Each battery module 14 may include a plurality of electrochemical cells, such as lithium-ion cells. In this embodiment, bus bars 52 may electrically couple the positive terminal 58 of one battery module 14 with a negative terminal 60 of a second battery module 14. In this way, multiple battery modules 14 may be connected in series to provide a desired electrical power output to a vehicle propulsion system or other load.

In the embodiment of the service disconnect unit 16 shown in FIG. 4, the bus bar 52 may be different from the other bus bars 52 that are not service disconnect units 16. Specifically, the bus bar 52 of the service disconnect unit 16 may include a first portion 54 and a second portion 56 that are electrically insulated from one another by a casing 130, which is made of an electrically insulating material, such as plastic. The first and second portions 54 and 56 may be electrically coupled to each other by the removable conductive member 50 to link the positive high voltage terminal 58 and the negative high voltage terminal 60. The bus bar portions 54 and 56 may be formed from copper, or any other conductive material known to those skilled in the art. The removable conductive member 50 may be inserted into an opening 62 that extends through the first and second portions 54 and 56 of the bus bar 52 to electrically couple the two portions 54 and 56. When the removable conductive member 50 is removed from the opening 62, the first and second portions 54 and 56 of the bus bar 52 are no longer electrically connected to each other, and the battery system 12 is disabled. It should be understood that the removable conductive member 50 does not necessarily need to be completely removed from the opening 62 to disconnect the terminals of the battery modules 14; the member 50 need only be moved far enough that current flow between the first portion 54 and the second portion 56 is interrupted. In some embodiments, the removable conductive member 50 may be configured to reversibly interrupt the electrical connection between the first and second portions 54 and 56, such that when the user is finished servicing the battery system 12, the user may re-insert the removable conductive member 50 to restore electrical conductivity between the first and second portions 54 and 56. Depending on the size and voltage of the battery system 12, multiple service disconnect units 16 may be used. For example, in certain embodiments, multiple service disconnect units 16 may be used to keep the voltage present at any one service disconnect unit 16 below a predetermined voltage limit, e.g., 60 volts.

Figure 5:
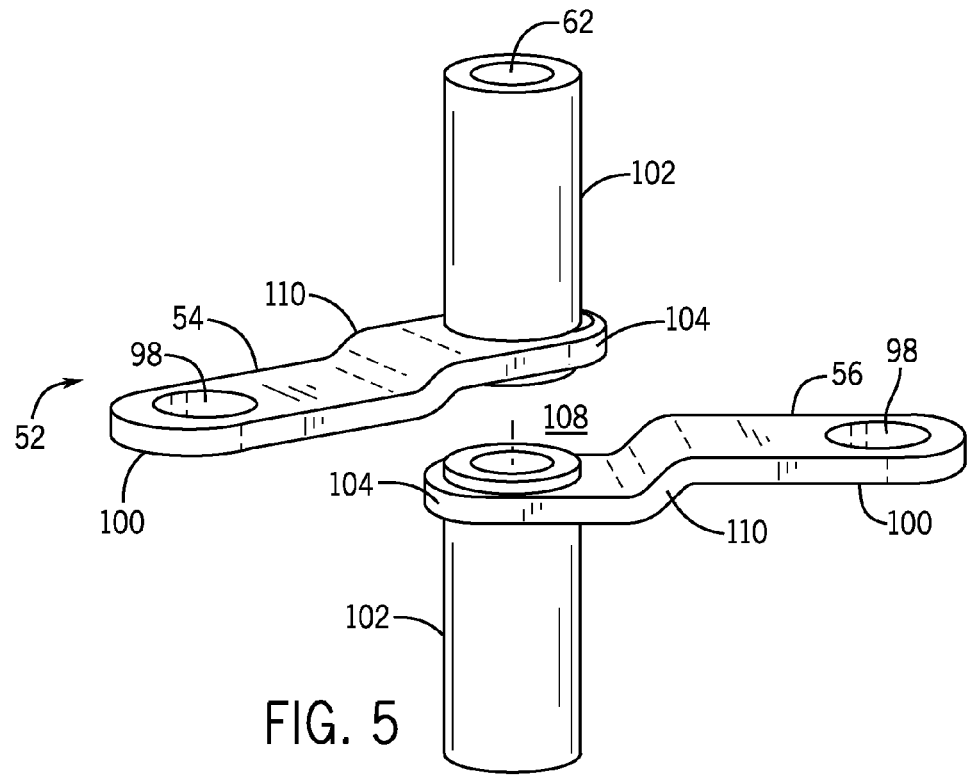
FIG. 5 is a perspective view of a bus bar that forms a portion of the service disconnect unit of FIG. 3.

FIG. 5 shows the first portion 54 of the bus bar and the second portion 56 of the bus bar. The two portions 54 and 56 may be similar in size, shape, and design, and, when present in the battery system 12, they may electrically connect the negative terminal 60 of one battery module 14 to the positive terminal 58 of an adjacent battery module in the battery system. Each portion 54 and 56 of the bus bar 52 may be configured to attach to a battery module 14 terminal (e.g., positive terminal 58 or negative terminal 60) at a first end 100, which may include an opening 98 for mounting. Each portion 54 and 56 may also include a connector 102 to receive a removable conductive member 50 at a second end 104. Each connector 102 may include an aperture 106, with the apertures 106 comprising the opening 62 configured to receive the removable conductive member 50. The connectors 102 of the first and second portions 54 and 56 of the bus bar 52 may be axially 80 aligned such that the removable conductive member 50 may extend through the two connectors 102 and electrically couple the first portion 54 of the bus bar 52 with the second portion 56 of the bus bar 52.

Each connector 102 may include a compression or pressure fitting configured to receive the removable conductive member 50. In a presently contemplated embodiment, a compressible metallic sleeve may be included inside the connector 102 to provide an electrical contact interface between the connector 102 and the removable conductive member 50 (e.g., the pin 150). The compressible metallic sleeve may be configured to receive the removable conductive member 50, and may further be configured to exert a force radially inward on the removable conductive member 50, thereby holding the removable conductive member 50 in place and securing an electrical connection between the removable conductive member 50 and the connector 102. It is understood that any suitable technique that provides an electrical connection between the removable conductive member 50 and the connector 102 may be employed.

As shown, the first and second portions 54 and 56 of the bus bar 52 may be oriented to overlap each other. To ensure that the first and second portions 54 and 56 of the bus bar 52 do not touch each other when the conductive member 50 is not in place, a gap 108 may be formed between each portion 54 and 56 by a bend 110.

Figure 6:
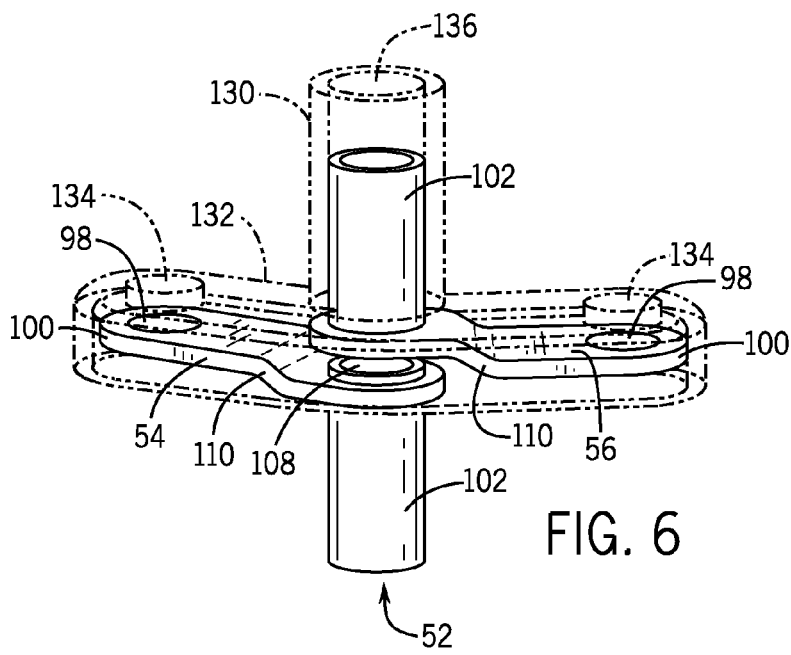
FIG. 6 is a perspective view of the bus bar of FIG. 5, having an electrically insulating casing.

The first and second portions 54 and 56 of the bus bar 52 may be electrically insulated from each other by a casing 130, as shown in FIG. 6, which may be constructed of plastic or other suitable non-conductive material. The casing 130 may ensure that the first and second portions 54 and 56 of the bus bar 52 are insulated from each other, and ensure that the outer surface 132 of the service disconnect unit 16 is non-conductive. The casing 130 may be injection molded over the portions 54 and 56 of the bus bar 52, for example. To enable the portions 54 and 56 of the bus bar 52 to make the electrical connections, the insulating casing 130 may include terminal openings 134 generally aligned with the openings 98 to enable each portion 54 and 56 of the bus bar 52 to electrically connect to the battery module 14. The casing 130 may also include a connector portion 136 that surrounds at least one of the connectors 62 to facilitate attachment of the conductive member 50. The connector portion 136 may extend axially beyond the connector 62 of one or both portions 54 and 56 of the bus bar 52 to provide structural support, to ensure electrical isolation from the outer surface 132, and/or to help set the depth of the removable conductive member 50 in the opening 62, among other things.

Figure 7:
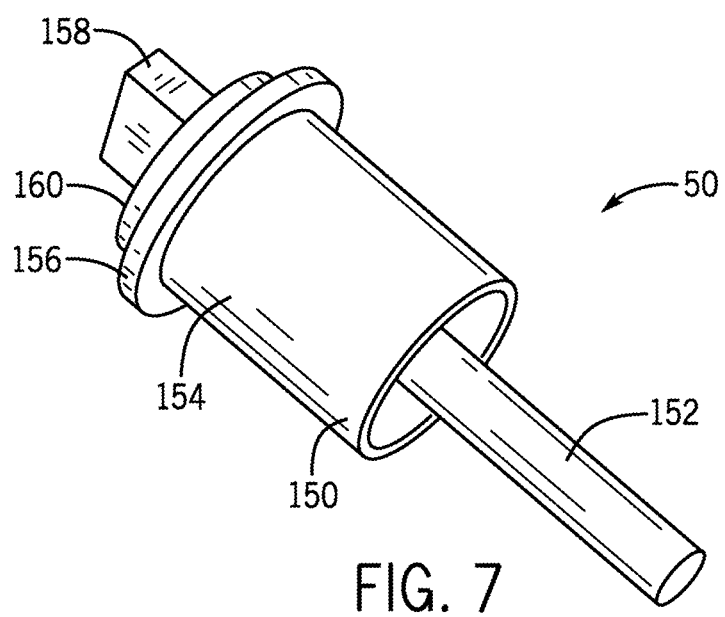
FIG. 7 is a perspective view of a conductive member configured to be inserted into the bus bar of FIG. 5.

FIG. 7 illustrates an embodiment of the removable conductive member 50 that may electrically couple the first and second portions 54 and 56 of the bus bar 52 together. As shown, the removable conductive member 50 may include a pin 152 constructed of an electrically conductive material, such as copper. The pin 152 may be configured to extend into the connectors 102 of the portions 54 and 56 of the bus bar 52 to make the appropriate electrical connection between the two portions 54 and 56 of the bus bar 52. The connectors 102 may include an attachment device, such as a compression or pressure fitting, threaded connection, or quick disconnect system, to provide electrical contact between the connector 102 and the pin 152. As shown, the conductive member 50 may also include a head 154 that extends around a portion of the pin 152. The head 154 may be constructed of a non-conductive material, such as plastic, and may fit over the connector portion 136 of the casing 130 to ensure that no conductive portions of the service disconnect unit 16 are exposed to the outer surface 132. The head 154 may include a lip 156 that extends radially 82 outward. Additionally, the head 154 may also include a protrusion 158 that extends from the top surface 160 of the head 154, which may act as a handle to allow the user to more easily insert and remove the conductive member 50. The protrusion 158 is shown as a rectangular protrusion, but it is understood that the protrusion 158 could take other shapes or forms, including a tab, a loop, or a hook. Further, the head 154 and the connector portion 136 may be threaded or otherwise configured to secure the conductive member 50 to the casing 130.

Figure 8:
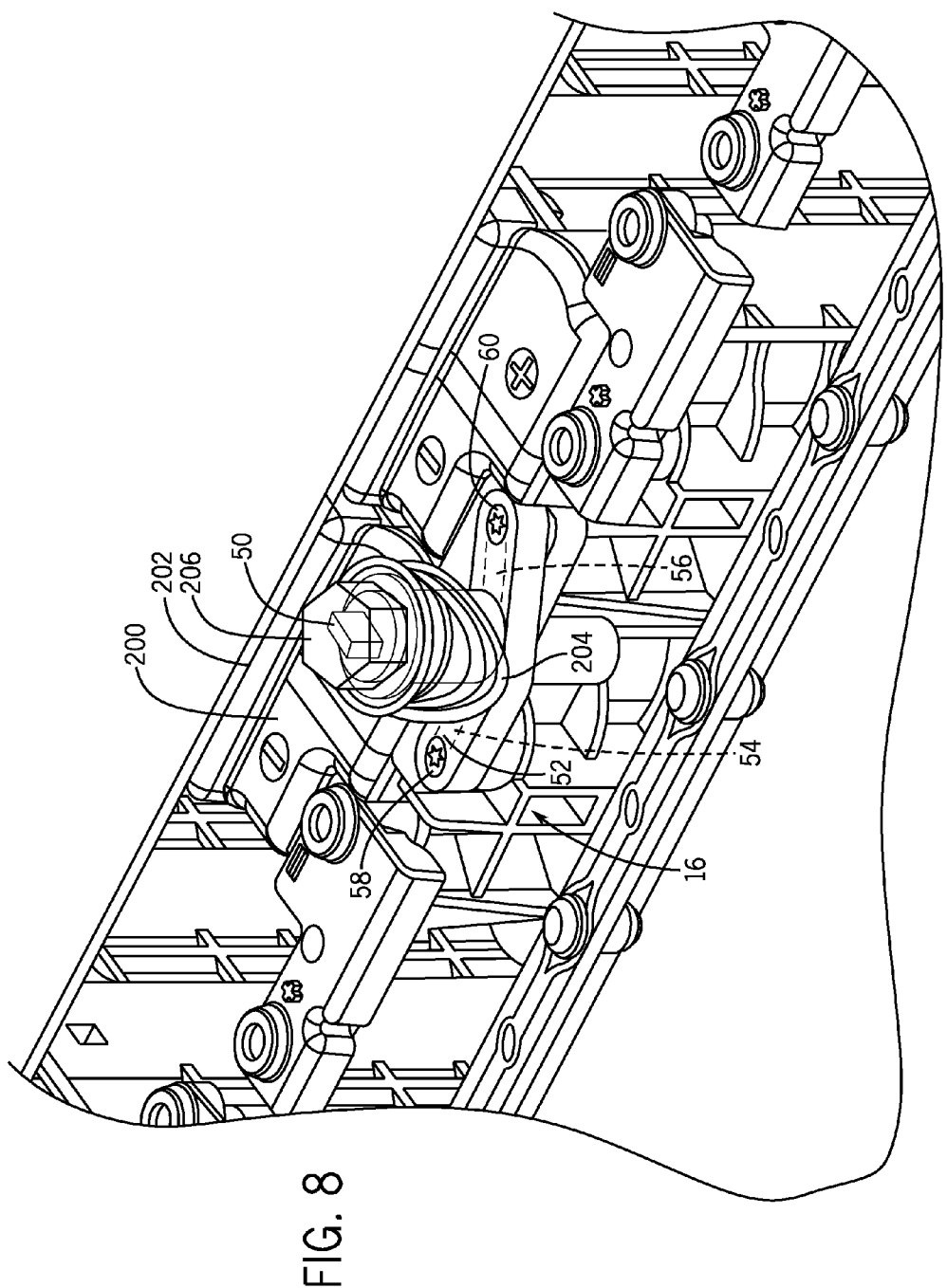
FIG. 8 is a partial perspective view of an embodiment of battery system having a cover coupled to the service disconnect unit of FIG. 3, in accordance with an embodiment of the present disclosure.

As mentioned previously, a cover 200 of a housing 202 for the battery system 12 may fit over the top of the battery module 14, as shown in FIG. 8. In certain embodiments, the cover 200 may include a plug 204 disposed over the removable conductive member 50. The plug 204 may be mechanically coupled to the cover 200. For example, in some embodiments, the plug 204 may include a plastic nut 206 that couples to the top surface 160 of the removable conductive member 50, such as by threading so that the removal of the cover 200 also removes the conductive member 50. In other embodiments, the plug 204 on the cover 200 of the battery system 12 may axially overlap the removable conductive member 50, and the plug 204 may be configured to be removed to allow the user to remove the removable conductive member 50, such that the removable conductive member 50 may be pulled through the cover 200 of the battery system 12 housing 202 while the cover 200 remains in place. In embodiments where more than one service disconnect unit 16 is included in the battery system 12, the cover 200 of the battery system 12 include a plug 204 for each removable conductive member 50. Thus, the cover of the battery system 12 may enable the user to disengage a plurality of service disconnect units 16, either via removal with the cover 200, or removal through the cover 200 (e.g., such as through plugs 204).

One or more of the disclosed embodiments, alone or in combination, may provide one or more technical effects useful in the manufacture and use of service disconnect units for battery systems. For example, certain embodiments of the present approach may enable improved accessibility to the service disconnect unit. By specific example, integrating the service disconnect unit into a bus bar, as set forth above, may allow the battery system to be disconnected by removing a removable conductive member, which may be configured to be removed with a battery cover. As such, the service disconnect unit, as presently disclosed, may generally improve the systems and methods of disconnecting battery systems. The technical effects and technical problems in the specification are exemplary and are not limiting. It should be noted that the embodiments described in the specification may have other technical effects and can solve other technical problems.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery system, comprising:
   at least a first battery module and a second battery module; and
   a service disconnect unit electrically coupling the first battery module to the second battery module, the service disconnect unit comprising a bus bar and a removable conductive member;
   wherein the bus bar comprises a first portion electrically connected to the first battery module, and a second portion electrically connected to the second battery module;
   wherein the first portion and the second portion of the bus bar each comprise a respective first end, a respective second end, and a respective annular connector, each respective annular connector being electrically conductive, protruding transverse to a direction extending from the respective first end to the respective second end, and having an opening extending therethrough, wherein the opening of the respective annular connector of the first portion of the bus bar and the opening of the respective annular connector of the second portion of the bus bar are axially aligned with one another, and wherein the respective annular connectors are separated by a gap at the respective second ends; and wherein the removable conductive member comprises a pin inserted into the axially aligned openings of the first and second portions of the bus bar to electrically connect the first portion of the bus bar to the second portion of the bus bar and electrically connect the first battery module to the second battery module.

2. The system of claim 1, wherein the removable conductive member comprises a non-conductive head extending coaxially about a portion of the pin and the annular connector of either of the first or second portions of the bus bar, wherein the non-conductive head is configured to facilitate removal of the removable conductive member from engagement with the first and second portions of the bus bar.

3. The system of claim 1, wherein the service disconnect unit comprises an electrically insulating casing disposed about the first and second portions of the bus bar to electrically insulate the first and second portions of the bus bar from one another such that the pin of the removable conductive member is the only feature electrically coupling the first and second portions of the bus bar.

4. The system of claim 1, wherein the respective annular connectors of the first and second portions of the bus bar each comprise a respective compression fitting for the pin of the removable conductive member.

5. The system of claim 1, wherein the removable conductive member is configured to reversibly interrupt an electrical connection between the first and the second portions of the bus bar.

6. The system of claim 1, wherein the battery system includes a plurality of service disconnect units.

7. The system of claim 1, wherein a battery cover of the battery system is coupled to the removable conductive member, such that removing the battery cover removes the removable conductive member, thereby interrupting an electrical connection between the first and second portions of the bus bar established by the pin.

8. The system of claim 7, wherein the removable conductive member is threadably coupled to the battery cover.

9. The system of claim 7, wherein a plug in the battery cover is configured to be removed with the removable conductive member.

10. A service disconnect unit comprising:
a bus bar, comprising:
a first portion of the bus bar having a first connector protruding from the first portion, wherein the first portion of the bus bar is configured to be electrically connected to a first battery module; and
a second portion of the bus bar having a second connector protruding from the second portion, wherein the second portion of the bus bar is configured to be electrically connected to a second battery module, and the second portion of the bus bar is in a fixed position relative to the first portion of the bus bar in which the second portion is electrically insulated from the first portion; and
a removable conductive member configured to provide an electrical connection between the first and the second connectors of the respective first and second portions of the bus bar, wherein the removable conductive member comprises a pin configured to be inserted into a first connection opening of the first connector and a second connection opening of the second connector when the first and second connection openings are axially aligned with one another.

11. The service disconnect unit of claim 10, wherein the first connector and the second connector are each defined by a respective protrusion having an opening extending longitudinally through the respective protrusion, the openings of the first and second connector being configured to axially align with one another and to receive the removable conductive member.

12. The service disconnect unit of claim 11, wherein the removable conductive member comprises a pin configured to be inserted into the axially aligned openings of the first and second portions of the bus bar.

13. The service disconnect unit of claim 10, wherein the service disconnect unit configured to couple to a battery cover of a battery system to cause the electrical connection between the first and second portions of the bus bar to be broken when the battery cover is removed from the battery system.

14. The service disconnect unit of claim 13, wherein the removable conductive member is threadably coupled to the battery cover.

15. The service disconnect unit of claim 10, wherein the electrically insulating casing is injection molded about the first and second portions of the bus bar.

16. A method for manufacturing a battery system having an integrated bus bar service disconnect unit, comprising:
electrically connecting a first battery module to a second battery module using a service disconnect unit, wherein the service disconnect unit comprises:
a bus bar comprising a first portion configured to be electrically connected to the first battery module, and a second portion configured to be electrically connected to the second batter module, wherein the second portion of the bus bar is in a fixed axial position relative to the first portion of the bus bar and is electrically insulated from the first portion of the bus bar; and
a removable conductive member configured to electrically connect the first portion and the second portion of the bus bar.

17. The method of claim 16, comprising placing a cover over the battery system-and coupling the cover to the removable conductive member.

18. The method of claim 16, wherein the service disconnect unit comprises an electrically insulating casing injection molded about the first and second portions to electrically insulate the first and second portions from one another.

19. The method of claim 16, comprising providing a compression fitting in the first and second portions of the bus bar to electrically couple each bus bar portion to the removable conductive member.

20. The system of claim 1, wherein the annular connectors of the first and second portions protrude away from one another.

* * * * *